Figure 1:
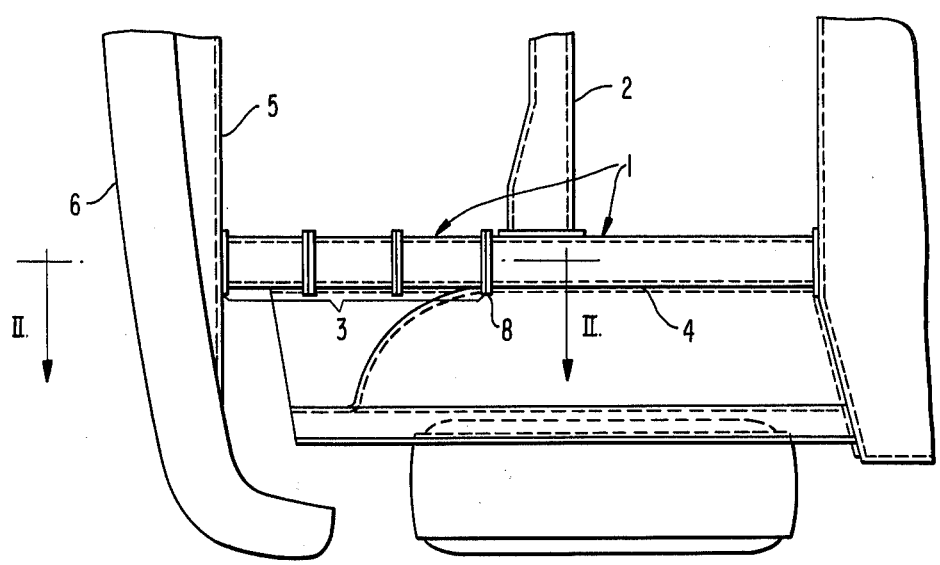

United States Patent
Reidelbach et al.

[11] 4,152,012
[45] May 1, 1979

[54] LONGITUDINAL BEARER AND METHOD OF CONSTRUCTING SAME

[75] Inventors: Willi Reidelbach, Sindelfingen; Hermann Renner, Magstadt; Wolfgang Klie, Korntal, all of Fed. Rep. of Germany

[73] Assignee: Daimler-Benz Aktiengesellschaft, Fed. Rep. of Germany

[21] Appl. No.: 799,516

[22] Filed: May 23, 1977

[30] Foreign Application Priority Data

May 29, 1976 [DE] Fed. Rep. of Germany ....... 2624188

[51] Int. Cl.² .................................................. B62D 21/02
[52] U.S. Cl. .................................... 280/784; 280/785; 293/133
[58] Field of Search ................... 280/106 R, 784, 785; 293/63, 64, 69 R, 70, 75, 76, 77, 99

[56] References Cited
U.S. PATENT DOCUMENTS

| | | | |
|---|---|---|---|
| 3,912,295 | 10/1975 | Eggert | 293/63 |
| 3,915,486 | 10/1975 | Maeda | 293/63 |

FOREIGN PATENT DOCUMENTS 1135776  8/1962  Fed. Rep. of Germany .......... 280/796

Primary Examiner—Joseph F. Peters, Jr.
Assistant Examiner—John A. Carroll
Attorney, Agent, or Firm—Craig & Antonelli

[57] ABSTRACT

A longitudinal bearer constructed as hollow profile of a motor vehicle frame, which is equipped with introduction places for introducing chassis forces into the frame and into the longitudinal bearer and with a longitudinal deformable bearer section arranged outside of the introduction places and dissipating impact energy; the longitudinal bearer section which by reason of different wall thicknesses has a resistance to buckling that increases in the direction toward the vehicle center, is transversely subdivided over its length at least into two bearer pieces connected with each other by circumferential seams; the wall thickness of a respective bearer piece becomes greater and/or the wall quality thereof becomes better in the direction toward the vehicle center from bearer piece to bearer piece than the wall thickness and/or the wall quality of the bearer piece disposed in front thereof.

6 Claims, 2 Drawing Figures

LONGITUDINAL BEARER AND METHOD OF CONSTRUCTING SAME

The present invention relates to a longitudinal bearer constructed as hollow profile of a motor vehicle frame with introduction places for the introduction of chassis forces into the frame and into the longitudinal bearer and with a longitudinal, deformable bearer section arranged outside of the introduction places and dissipating impact energy which, by reason of a differing wall thickness course, has a resistance to buckling that increases in the direction toward the vehicle center.

A longitudinal bearer with a differing wall thickness course is illustrated, for example, in the German Offenlegungsschrift 2,421,233. The longitudinal bearer illustrated therein has a wall thickness increasing continuously over the length thereof and achieves thereby a resistance to buckling that increases in the direction toward the vehicle center. In case of a collision, at first the buckling or bulging rigidity of the bearer is exceeded in the more thin-walled areas of the longitudinal bearer located near the vehicle end and the bearer will bulge or buckle initially within this area. If the yieldingness is then exhausted by bulging or buckling within this area of the longitudinal bearer, then with a continuing collision force, the bulging or buckling limit is exceeded in the adjoining still unbulged or unbuckled longitudinal bearer area located nearer the vehicle center, and so on. By reason of the different form-rigidity, it will therefore lead to a relatively orderly progress of the bulging or buckling of the longitudinal bearer that begins in front, and to an energy absorption continuing over the entire buckling distance which is at a relatively high level. Simultaneously therewith, the bearer also possesses a high bending strength with slight material usage because it can be readily made to approximate a bearer with the same bending strength.

However, it is disadvantageous with this type of longitudinal bearer construction that the varying wall thickness of the hollow profile can be manufactured only with difficulty. It involves an individual part separately installed into the construction and manufactured as special part in a complicated manner by pressing or hollow rolling.

It is the aim of the present invention to indicate measures, on the basis of which the advantages of the known longitudinal bearer—namely high material exploitation as bending and as buckling bearer and orderly bulging or buckling behavior with constant high energy absorption capacity—remain preserved or are taken over, but which permit to avoid the aforementioned disadvantages—namely, unfavorable manufacture. As to the rest, a partial replacement is to be possible in case of an only partial damage.

The underlying problems are solved according to the present invention —starting with the longitudinal bearer described hereinabove—in that the longitudinal bearer section is transversely subdivided over its length into at least two bearer pieces connected with each other by circumferential seams, whose wall thickness and/or material quality are respectively greater or better from bearer piece to bearer piece in the direction toward the vehicle center than the wall thickness or material quality of the respective bearer piece located in front thereof.

The stepwise change of the bearer wall thickness and/or of the material quality in individual pieces permits the use of stamped or pressed-out parts of constant wall thickness and/or constant material quality which can be manufactured in a simple manner. Nonetheless, a varying rigidity progress can be readily approximated in the desired manner. As to the rest, in case of only partial damage of the longitudinal bearer, the damaged pieces can be replaced. As a result thereof, the vehicle chassis becomes more favorable as regards repairs.

In order to obtain more form-stable sections at the bearer sections within given areas, provision may be made that flanges are provided along the circumferential seams at both mutually abutting bearer pieces. The flange seams effect a junction formation and local reinforcements and any buckling and bulging action will occur between the flange seams. The pieces may be welded together along the circumferential seams of any desired shape or may be threadably connected, for example, by way of the flange seams. In every case, however, one will appropriately so constitute the seam construction and so arrange the seam that it can be readily separated subsequently, for example, after a collision and a new bearer piece can be readily installed.

Accordingly, it is an object of the present invention to provide a longitudinal bearer for a motor vehicle frame, which avoids by simple means the aforementioned shortcomings and drawbacks encountered with the prior art construction.

Another object of the present invention resides in a longitudinal bearer of the type described above which can be manufactured relatively easily and relatively inexpensively.

A further object of the present invention resides in a longitudinal bearer which makes possible a partial replacement in case of only partial damage.

A still further object of the present invention resides in a longitudinal bearer which assures a high degree of material utilization as bending and buckling bearer as well as an orderly buckling and bulging behavior, yet avoids the difficulties of manufacture involved in the prior art longitudinal bearers.

Another object of the present invention resides in a longitudinal bearer which permits a predetermined buckling and bending behavior by extremely simple means.

Figure 2:
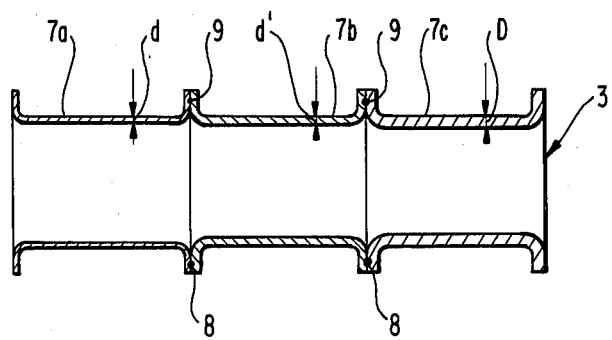

These and other objects, features and advantages of the present invention will become more apparent from the following description when taken in connection with the accompanying drawing which shows, for purposes of illustration only, one embodiment in accordance with the present invention, and wherein:

FIG. 1 is a plan view on a front portion of a somewhat simplified body with a forward longitudinal bearer section according to the present invention subdivided transversely into three pieces; and FIG. 2 is an axial cross-sectional view through an individual longitudinal bearer section according to the present invention.

The passenger motor vehicle body which is only partially illustrated with its front portion, includes a form-stable passenger cell and a deformable front structure adapted to be deformed in a predetermined, aimed-at manner in case of a collision as well as a correspondingly constructed rear portion. A pair of longitudinal bearers 1 constructed as hollow profile members form an essential component of the frame of the self-supporting body, which, inter alia, are connected with each other by a cross bearer 2 and which consist of two sections within the area of the front structure, whose one outer section 3 is located in front of the cross bearer 2, i.e., toward the vehicle outer end, and whose other, inner section 4 is located inside the cross bearer 2. Within the area of the forward cross bearer 2, the body is supported on the front axle (not shown), i.e., the inner longitudinal bearer 4 must absorb together with other parts of the self-supporting body the vehicle weight. The outer longitudinal bearers 3 which are connected once more by a transverse girder 5 at their outer ends carry essentially together with adjoining body parts only the body parts located in front of the cross bearer 2 and absorb the longitudinal impacts on the bumper 6.

In addition to the other supporting body parts, above all the bearers of the body and of those, especially the longitudinal bearers are so constructed that in case of an impact load they buckle or bulge and yield under absorption and dissipation of the impact energy. The energy absorption capacity is thereby to remain as uniformly as possible at a relatively high, but tolerable level during the buckling or crash period. Simultaneously therewith, the bearers should not be unnecessarily heavy and thick-walled.

For that purpose, the outer longitudinal bearer section 3 is transversely subdivided in the illustrated embodiment into three pieces 7a, 7b and 7c which may be constructed as circular pieces or as polygonal pieces, especially as four-cornered or square pieces. The pieces possess a uniform wall thickness d, d' and D throughout each respective individual piece in a manner favorable for manufacture, but possess a wall thickness with respect to each other that increases stepwise in the direction toward the vehicle center. The pieces are connected with each other or with the adjoining bearers by cross or circumferential seams 8 extending in the circumferential direction, which is completely non-problematical from a manufacturing point of view. In the illustrated embodiment, the cross seams are constructed as flange seams which are connected by spot-welded connections 9. The pieces are reinforced by the flanges within the seam area so that the welded connection receives a certain relief or unstressing compared to non-reinforced seam constructions; additionally, a type of junction formation is attained which favors a local bulging or buckling within the smooth area of the pieces intermediate the seams.

In case of collision, the most thin-walled piece 7a located nearest the impact will buckle or bulge at first and will fold more or less strongly into block, i.e., into a configuration in which adjacent folds rest directly on one another thereby substantially preventing further compression. Subsequent thereto—with a continuing collision force—the next piece will bulge or buckle, and so on. A good, uniformly high distribution of the energy absorption capacity is achieved over the collision distance of the bearer section 3.

The cross seams 8 are so constructed that, for example, in case of a bulging or buckling of only the most forward piece 7a, the latter can be cut out of the longitudinal bearer section and the flanges of the adjoining bearer parts can be ground clean, for example, by means of an angular grinding machine. Subsequent thereto, the missing piece can then be replaced by a new, non-damaged piece and can be secured by spot-welding in the bearer. The bearer construction according to the present invention is therefore very favorable as regards repairs since a partial renewal or replacement is possible.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all those changes and modifications as are encompassed by the scope of the appended claims.

We claim:

1. A longitudinal bearer constructed as a hollow profile of a motor vehicle frame with introduction places for introducing chassis forces into the frame and into the longitudinal bearer, which comprises a longitudinal, deformable bearer section arranged outside of the introduction places for dissipating impact energy, said deformable bearer section being formed of a plurality of longitudinally extending bearer pieces connected one to another by circumferential seams, each of said bearer pieces having a different resistance to buckling than the other bearer pieces and all of said bearer pieces being connected together in order of increasing buckling resistance from piece to piece in a direction toward the vehicle center, wherein said circumferential seams are formed, by radially extending circumferential flanges on each adjoining end of abutting bearer pieces which have been joined in a manner permitting subsequent separation thereof, so as to constitute means for enabling radial removal of an individual damaged bearer piece and replacement of said damaged bearer piece with an undamaged individual bearer piece.

2. A longitudinal bearer according to claim 1, characterized in that the wall thickness is greater from bearer piece to bearer piece in the direction toward the vehicle center than the wall thickness of the bearer piece disposed in front thereof.

3. A longitudinal bearer according to claim 1, characterized in that the material buckling resistance is better from bearer piece to bearer piece in the direction toward the vehicle center than the buckling resistance of the bearer piece disposed in front thereof.

4. A longitudinal bearer according to claim 1, characterized in that the bearer pieces are welded together.

5. A longitudinal bearer according to claim 1, characterized in that the bearer pieces are threadably connected by means of flange bolts.

6. A method of forming a renewable bearer constructed as a hollow profile of a motor vehicle frame with introduction places for introducing chassis forces into the frame and into the longitudinal bearer comprising the steps of:
 (a) forming a plurality of bearer pieces, each having a different resistance to buckling than the other bearer pieces, and providing each of said pieces with radially extending circumferential flanges;
 (b) forming a longitudnal deformable bearer section by connecting flanges of said pieces one to another in order of increasing resistance in a manner permitting subsequent separation thereof and replacement of individual damaged bearer pieces, by radially removing the damaged piece, with an individual undamaged piece; and
 (c) arranging said longitudinal bearer section outside of the introduction places so that the resistance to buckling of the bearer pieces increases in a direction toward the vehicle center.

* * * * *